United States Patent [19]

Hausdörfer

[11] 4,374,396
[45] Feb. 15, 1983

[54] CHROMINANCE SUB-CARRIER MODIFIER FOR PAL-COLOR TELEVISION SIGNALS

[75] Inventor: Michael Hausdörfer, Mühltal, Fed. Rep. of Germany

[73] Assignee: Robert Bosch GmbH, Stuttgart, Fed. Rep. of Germany

[21] Appl. No.: 205,219

[22] Filed: Nov. 10, 1980

Related U.S. Application Data

[63] Continuation-in-part of Ser. No. 33,536, Apr. 26, 1979, abandoned.

[51] Int. Cl.³ .................... H04N 9/50; H04N 9/38; H04N 5/78
[52] U.S. Cl. .................... 358/24; 358/312; 360/10.3
[58] Field of Search ............ 358/4, 8, 11, 16, 24, 358/25; 360/10

[56] References Cited

U.S. PATENT DOCUMENTS

| | | | |
|---|---|---|---|
| 3,627,910 | 12/1971 | Janssen et al. | 358/24 X |
| 3,745,239 | 7/1973 | Renaud | 358/24 |
| 4,051,516 | 9/1977 | Weston | 358/11 |
| 4,117,509 | 9/1978 | de Boer | 358/4 |
| 4,213,774 | 10/1978 | Hjortzberg | 358/4 |
| 4,217,603 | 8/1980 | Hjortzberg | 358/4 X |
| 4,283,736 | 8/1981 | Morio et al. | 358/4 |

FOREIGN PATENT DOCUMENTS

| | | | |
|---|---|---|---|
| 1015179 | 12/1965 | United Kingdom | 358/11 |
| 1448979 | 9/1976 | United Kingdom | 358/24 |

OTHER PUBLICATIONS

"Telefunken-Zeitschrift", series 37, 1964, No. 2, pp. 115-135.

Primary Examiner—Aristotelis M. Psitos
Attorney, Agent, or Firm—Frishauf, Holtz, Goodman & Woodward

[57] ABSTRACT

The present invention relates to a chrominance sub-carrier modifier for PAL-color television signals, particularly for signals from a video storage medium operating in a still picture mode.

5 Claims, 1 Drawing Figure

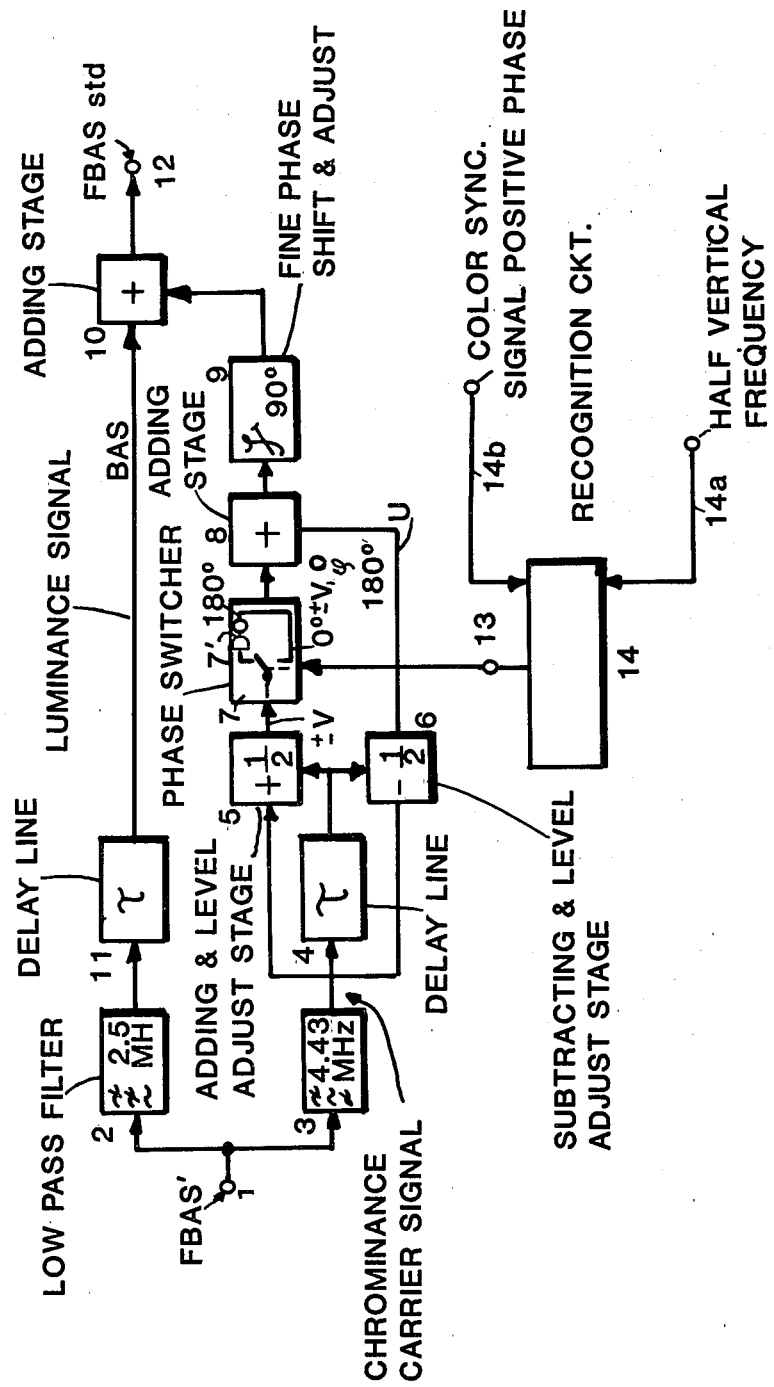

CHROMINANCE SUB-CARRIER MODIFIER FOR PAL-COLOR TELEVISION SIGNALS

This application is a continuation-in-part of Ser. No. 33,536 filed Apr. 26, 1979, now abandoned.

BACKGROUND AND PRIOR ART

Chrominance carrier modifiers are needed, for example, for reproduction of still pictures by PAL-color video signals recorded on magnetic tape in helical scan systems. In reproduction of still pictures, the tape advance is stopped, and the signal track is scanned by a magnetic head at 50 or 60 times a second. In a still picture reproduction of recorded PAL-color video signals, it is necessary to maintain the PAL-standard monotone alternation of the switching phase frequency which is lost when scanning a stopped tape.

Chrominance sub-carrier modifiers are known, see for example, the periodical "Telefunken-Zeitschrift", series 37, 1964, No. 2, pages 115-135. In such a known chrominance sub-carrier modifier, a reference carrier with double the frequency is modulated with a color signal F by means of a balanced modulator. The upper sideband is filtered out of the resulting heterodyne products. The remaining lower sideband F* corresponds to the conjugated complex form of the color signal F. An electronic switch thereafter selects out the proper sequence of the chrominance signal types F and F*.

Known chrominance sub-carrier modifiers with a double balanced or push-pull modulator have some disadvantages when used to reconstitute the phase relationships of PAL-video signals. Aside from the expense of the double balanced modulator and the frequency doubler, as well as the tolerance problems relating to the necessary phase adjustments, a shift from zero line offset to half line offset arises in the luminance component in the frequency range of the chrominance sub-carrier frequency if the original subcarrier is in a quarter line relationship. A reduction of horizontal resolution in one field is also observed. Disturbances due to color cros-talk arise as well.

It has previously been proposed—see British Pat. No. 1,015,179, Telefunken, to change signals following the standards of the PAL-color television system to those of a non-alternating system like the NTSC system but which is not adopted to the standardized NTSC system, in which special circuitry is provided to improve the color rendition even if phase errors may occur. As described, the color sub-carrier signal of one line, separated from the brightness signal, and the delayed color sub-carrier signal of the preceding line of substantially the same amplitude and phase—and also separated from the brightness signal—are added in a first combining stage and subtracted in another combining stage. The outputs from the two combining stages are added in an adder to the brightness signal from which the color sub-carrier signal has been removed. The negative polarity of the output signal in each alternate line is phase-shifted by 180° by a phase shifter included in the circuit after the second combining stage, and operating at line frequency. The line-by-line alternation of the I-signal of the NTSC PAL-signal is thus eliminated. This signal—with reference to line alternation—is actually an NTSC signal.

THE INVENTION

It is an object to provide a signal modifier circuit which processes signals for reproduction from stationary recording tape—that is, still frame pictures—in which the signals, alternately, can be reconstituted to form interlaced first and second half frames; which does not require expensive modulation and filtering technologies and eliminates the need for adjustments connected therewith, while improving the signal-to-noise ratio.

Briefly, a PAL-signal splitting device adds and subtracts the chrominance sub-carrier signal to and from a chrominance sub-carrier signal which is delayed by 283.5 or 284 signal periods. The added signal then passes through a controlled phase switcher to the input of an adding stage which also receives the difference signal. The output of the adding stage provides a standard chrominance sub-carrier signal. In a preferred form, the circuit further comprises a second adding stage. The second adding stage receives (a) the standardized chrominance sub-carrier signal which has passed through an adjustable fine-adjustment phase shifter and (b) a separated, delay equalized luminance or brightness signal. The output of the second adding stage provides a standard PAL-color television signal (FBAS). The controlled phase switcher is provided with a bivalent control signal to change, or not to change the phase at half vertical frequency. The signal may have a voltage level which provides a high or low value to the phase switcher.

The circuit in accordance with the invention has the advantage that the expensive modulation and filtering technologies and the adjustments connected therewith can be eliminated. Since a PAL-signal splitter can be considered similar to a comb filter, a substantially improved signal-to-noise ratio is obtained. The noise in the color difference signal is averaged by the selective action of a comb filter.

If for PAL-color television signals the delay time of the delay line in the PAL-signal splitting is 283.5 or 284 chrominance sub-carrier periods, then the chrominance sub-carrier frequency color difference signals U and $\pm V$ can be separated by addition and subtraction. Due to the line-by-lline alternation of the color difference signal V, the switching phase sequence of the PAL-color television signal necessary for reproduction can be maintained also for still picture reproduction even though the applied signal lacks the phase alternation.

The drawing illustrates a preferred example, wherein the single FIGURE is a general, highly simplified block circuit diagram of the signal modifier circuit.

Terminal 1 is connected to receive a PAL-color television signal FBAS', i.e. the composite color video signal, which was generated by a storage medium to reproduce a still picture. As was explained above, the phase sequence of such a PAL-color television signal does not agree with the switching phase sequence set by the PAL-standard, and therefore must be processed to provide a standard PAL-FBAS signal. To this end, the PAL-color television signal FBAS' is separated into a luminance or brightness signal by means of a low-pass or comb filter 2 to then pass through a luminance signal channel and a chrominance carrier frequency color signal by means of a band pass filter 3 to then pass through a chrominance carrier signal channel. The chrominance signal is applied to a PAL-signal splitter, which consists of a delay line 4, an adding stage 5, and a subtracting stage 6. The delay line 4 delays the chrominance signal by 283.5 chrominance sub-carrier periods. The delayed chrominance sub-carrier frequency color signal is adding in the adding stage 5 to the non-delayed chrominance sub-carrier frequency color signal. The color difference signal ±V can be obtained at the output of the adding stage 5 after a level halving. The phase of the chrominance carrier frequency color difference signal ±V alternates from one line to the next. This chrominance carrier frequency color difference ±V is applied to a controlled inverter 7. Phase switcher 7 switches the phase of the incoming signal by 180°, as is well known, in accordance with the switch setting, as will appear, under control of a signal from terminal 13. The phase switcher includes a 180° phase changer in one branch, symbolically shown as inverter 7', to effect the 180° phase shift. A chrominance sub-carrier frequency color difference signal U is applied to an input of adding stage 8. The other input has the V signal from inverter 7 applied.

The chrominance carrier frequency color difference signal U is separated from stage 3 and obtained in the subtracting stage 6, the inputs of which receive the delayed and non-delayed chrominance sub-carrier frequency color signal. Stage 6 also provides for level halving.

A modified chrominance frequency color signal can be taken from the output of the adding stage 8 which, after a corresponding phase adjustment with a fine phase shifter 9, is applied onto an input of a second adding stage 10. The adding stage 10 combines the previously separated luminance signal and the signal from stage 9 to form a complete PAL-color television signal, after equalization of delay time in a delay line 11. A standard PAL-color television signal FBAS$_{std}$ can be taken from the output terminal 12 of the adding stage 10.

A square-wave control signal at half vertical frequency is fed through a terminal 13 to the controlled phase changer 7 to cause change-over of the switch therein and provide, respectively, the +V and the −V signals of respective phasing at field frequency.

The derivation of the control signal for the phase shifter 7 is obtained in a recognition circuit 14. The recognition circuit 14 recognizes even and odd-numbered fields for interlace, with respect to the PAL-switching phase sequence. This is accomplished by a time comparison of the beginning of the vertical impulse, applied over line 14a, and the positive switching phase position of the alternating color synchronizing signals applied over line 14b during the horizontal blanking interval in the PAL-color television signal of the scanned track of a magnetic transducing, e.g. recording and reproduction device.

The system, therefore, results in continuous repetition of the fields, for interlace, of the same image content, while retaining the typical phase change in the PAL-system. The result is a signal in which the different switching phase sequencing, changing from field to field in accordance with the PAL standard, is insured. The change-over in phase, obtained by the phase switcher 7, is controlled by the control signal from terminal 13 at half vertical frequency. Thus, sequential fields will have a different switching phase. The phase switching can be obtained, for example, by including an inverter in one branch of the phase switcher, and a straightforward connection in the other, and a transfer switch therebetween so that the resulting output signal will either be phase-changed or not. The system thus permits reproduction of a stored field, for interlace, by providing the corresponding signals in accordance with the PAL-system in which the subsequent fields are different with respect to the switching phase of the V-signal. To obtain this difference in switching phase, sequential half-frames or fields are switched over by the switch 7 at the half-vertical frequency. The change of the switching phase from line to line of course will be retained. The switch 7 will maintain the position either in the upper branch, as shown in the FIGURE, or in the lower branch for one field, since it switches over at half vertical (that is, field) frequency. Thus, even taking a V-signal with non-standard phasing, due to reproduction of a still picture, the phase position is reconstituted by inverting the respective switching phase in phase switcher 7 before the ±V-signal is added to the U-signal in adding stage 8 and then combined again with the luminance or brightness signal in adder 10.

The system works in the same way if the delay line has a delay of 284 subcarrier periods instead of 283.5 and if item 5 is a subtracting stage and item 6 is an adding stage.

I claim:

1. A chrominance carrier modifier apparatus for PAL-color television signals to provide television signals (FBAS$_{std}$) in accordance with PAL-standards derived from applied signals (FBAS') lacking chrominance sub-carrier frequency phase alternation, particularly when derived from magnetic transducer apparatus in which tape transport is stopped to reproduce still pictures comprising
    a PAL-signal splitter and delay circuit (4,5,6) in which the chrominance sub-carrier is added to, or subtracted from, respectively, a delayed chrominance sub-carrier signal which is time-delayed by a delay time of about 283.5 or 284 chrominance sub-carrier signal periods, to provide added and subtracted first Signals (U resp. V), respectively;
    a controlled inverter (7) connected to receive that one of the first signals, which periodically changes its sign (±V);
    means (13,14) connected to and controlling said controlled inverter (7) in accordance with a signal having half the vertical frequency to thereby control said controlled inverter (7) to provide inversion of said one of the first signals (±V) during each second field;
    and an adding stage (8) which receives the alternatingly direct and inverted first signal (±V) from the output of the controlled inverter (7) and the other first signal (U) and providing a second combined chrominance sub-carrier signal at its output.

2. Apparatus according to claim 1, further comprising means (2) separating the luminance signal component from the applied PAL-signal (FBAS') and providing a separated luminance signal;
    a second adding stage (10) receiving the combined chrominance sub-carrier signal (U±V) and said separated luminance signal, and combining said separated luminance and said chrominance sub-carrier signals;
    and delay means (11) interposed in the path of the luminance signal between said separating means (2) and said second adding stage (10) to adjust the delay time of the separated luminance signal to the delay time of the chrominance sub-carrier signal.

3. Apparatus according to claim 1, further including an adjustable phase shifter (9) connected to the chrominance subcarrier signal (U±V) to fine-adjust the phase position thereof.

4. Apparatus according to claim 1, wherein said means (13, 14) controlling the controlled inverter (7) comprises
a recognition circuit (14) recognizing, respectively, even and odd-numbered fields of the PAL switching phase sequence and providing a bivalent output control signal to said controlled inverter (7), in which the value level of said bivalent output control signal is a function of the phase position of the alternating bursts in the PAL-color TV signal.

5. Apparatus according to claim 4, wherein said phase position of the alternating burst is determined by time comparison of the start of the vertical pulse and the positive switching phase position of the alternating color synchronizing signals during the horizontal blanking interval in the PAL-color television signal.

* * * * *